May 31, 1966 P. G. RIDINGER 3,254,328

MAGNETIC BINARY CELLS

Filed Dec. 27, 1962

INVENTOR
P. G. RIDINGER
BY S E Hollander
ATTORNEY 3,254,328
Patented May 31, 1966

3,254,328
MAGNETIC BINARY CELLS

Philip G. Ridinger, Colts Neck, N.J., assignor to Bell Telephone Laboratories, Incorporated, New York, N.Y., a corporation of New York Filed Dec. 27, 1962, Ser. No. 247,679
17 Claims. (Cl. 340—147)

This invention relates to binary switching cells and, more particularly, to such cells performing sequential operations with ferreeds.

For many years the communications industry as well as other related areas have been cognizant of the need for and the usefulness of binary cells. Since many modern communications systems are based on complex binary switching arrangements, it is natural that much emphasis has been placed in the past on the development of binary cells which were adequate to meet the demands of the electronics art. Binary cells have, therefore, found many contemporary applications in such fields as computer technology and high speed data processing. However, for many years prior to the relatively recent concentrated emphasis on computers, telephone switching systems have also been dependent in large measure on binary switching and counting arrangements.

For example, the two stable states represented respectively by the open and closed positions of the contacts of a relay have been used for some time throughout the field of telephone switching to provide the fundamentals with which binary and other similar counting arrangements could operate. More recently, however, demands for greater speeds of operation were made. A system such as a fully electronic central office, wherein a truly integrated operation of high speed digital machines and telephone switching arrangements can be achieved, indicates the present day requirements for an efficient high-speed communications system. As can be seen in the contrast between the electromechanical operation of relays and the more electronically oriented high speed switching of an electronic central office, basic changes in switching design had to be made. An element was sought which could provide both the high speed operational requirements of the present day electronic period and yet also provide for reliable switching means such as those exemplified by the metallic contacts on the slower operating relays. One structure which resolved this essential problem of furnishing an element with such dual properties was that now commonly known as the ferreed, disclosed in Feiner-Lovell-Lowry-Ridinger Patent 2,995,637, issued August 8, 1961, and described on pages 1 to 30 of the Bell System Technical Journal, January 1960.

The ferreed, whose name implies common characteristics of both electronically and electromechanically responsive devices, provided the necessary compatibility by reconciling the singular advantages of the arts which the device represents. As explained in the patent cited supra, the ferreed's high speed aspect is its remanent magnetic members, capable of existing in either of two magnetic states depending upon the magnitude and direction of the current in its associated windings; these remanently magnetic members may be of ferrite or of other suitable material. The remanently magnetic ferrite or other material is switched from one state to the other in accordance with well-known magnetic circuit principles involving substantially square hysteresis loop operation. The ferreed's "electromechanical" aspect provides reliable switching by utilizing sealed magnetic reed switches which operate in response to changes in the magnetic state of the remanent members; this is a feature which has found wide acceptance in telephone switching applications.

Practical applications for the ferreed were priorly somewhat restricted in number however, due to the relatively slow response time of the reed switches. Since the remanent ferrite is capable of responding to input signals in the order of microseconds, and since the sealed reed switches do not change state in response thereto until a relatively longer time interval has passed, there appeared to be a troublesome and otherwise useless delay in the operation of ferreed circuits.

It is therefore an object of this invention to provide a ferreed binary cell in which the time delay between the response of the remanently magnetic member and the subsequent operation of the associated reed switches is utilized for switching purposes.

It is a further object of this invention to employ a sequentially operative binary cell, using ferreeds to provide the essential characteristics of memory, logic and delay needed for sequential operation.

It is also an object of this invention to provide a binary cell which combines the advantageous characteristics of magnetically responsive storage and reliable contact gating.

An additional object of this invention is to provide a binary cell whose switching states can be maintained without holding power.

In one specific illustrative embodiment of this invention, a double-rail binary cell using two parallel ferreeds is discolsed. When the current pulses from the common input terminal excite the windings of the cell so as to produce opposing fluxes in each of the side ferrite members of one of the ferreeds, the reed switches responsive to the changes in magnetic state of these members close, this being identified as the "set" condition. When, on the other hand, the input pulses produce aiding magnetic fluxes in the ferrite members of a ferreed in the cell as a result of excitation of the appropriate windings, the responsive reeds thereby open, this being identified as the "reset" condition. Two ferreeds are used to form a sequential binary cell, the fluxes in one ferrite leg of each of the ferreeds being permanently maintained in one state; the fluxes in the other ferrite leg of each of the ferreeds are alternately switched in opposite directions from each other by the input pulses. While in this embodiment, which employs a parallel ferreed, the remanent material is advantageously of ferrite, it is to be understood that in other embodiments other types of ferreeds could be utilized with remanents material of suitable metals, as known in the art.

The parallel ferreeds utilized in the instant invention each employ two reed switches whose positional states are dependent upon the remanent magnetic state of the switching ferrit leg of that ferreed. One reed switch associated with each ferreed is used for gating input pulses to the appropriate one of the two ferreeds in the binary cell, while the other reed switch provides an isolated external indication of the cell's state. The steering or gating reed switch of each ferreed gate input pulses to a winding on the switching leg of the other ferreed.

Since, in the illustrative embodiment presently referred to, input pulses to the binary cell excite the reset windings in both ferreeds, and the set winding in the ferreed to be set, a method of differential excitation is utilized. Input pulses, after having passed through both reset windings, pass through the second or set winding on the switching leg of the ferreed to be set, such set winding having a greater number of turns than the reset winding on the same switching leg in order to properly control the direction of the magnetic flux produced. The reset winding on the switching leg must have a sufficient number of turns so as to provide the appropriately controlling flux when that winding is the only winding being excited. Similarly, the turns ratio between the reset winding and the set winding on the switching leg must be determined so that a controlling flux is produced when both of these windings are excited in setting the ferreed.

Therefore, with the first ferreed in the binary cell hypothetically in the set state, wherein its reed switches are closed, and the second ferreed of the cell existing as the complement of the first ferreed and thus having its reed switches open (the reset state), the next input pulse to the cell will pass through the reset windings of both ferreeds and thence through the closed gating reed switch associated with the first ferreed and finally to the set winding on the switching leg of the second ferreed. This has the effect of resetting the first ferreed and shortly thereafter releasing its previously closed associated switches, and also of setting the second ferreed of the cell, thereby closing the reed switches responsive thereto. It should be noted that none of the responsive reed switches in either of the two ferreeds changes its state until after an input pulse has been completely steered through the closed reeds; this feature, only possible due to the inherent delay in operation of the reed switches in response to the changes in magnetic state of the remanent ferrite members and the relatively short duration pulse, insures that no breaking of pulse current occurs. The configuration formed by the respectively closed and open reed switches thus accomplishes logical gating of input pulses to change the state of the binary cell based upon the previous arrangement of the switches.

The binary cell, now having been switched to its second state, is responsive to the next input pulse after such a pulse has been similarly gated through all reset windings and thence to the controlling set winding of the first ferreed. When the corresponding reeds now operate in a manner essentially identical with that described supra, the binary cell is now returned to its original state. Thus, due to the inherent delay in operation of the reed switches, input pulses may be steered by the contacts of one ferreed to logically alter both its own state and that of the other ferreed in the binary cell. This arrangement, which will be more fully described in the detailed description infra, is practicable only because the inherent delay utilized in the instant invention allows pulses to be gated through a ferreed's still unresponsive contacts after that same ferreed has already switched its remanent magnetic state, but advantageously before its associated reed contacts have operated in response to this change in magnetic state. This aspect of the invention is beneficially employed by electrically locating the steering contact of each ferreed of the cell in series with the controlling set winding of the cell's other ferreed. An input pulse is therefore only steered to the set winding of a ferreed which is itself reset, such a pulse being so steered through the still closed steering reed switch of the complementary ferreed. The readout switches, operating in conjunction with the steering reeds, continuously furnish an external indication of the state of each ferreed and therefore of the overall condition of the binary cell.

It is therefore a feature of this invention that ferreed elements are utilized to form a binary cell.

It is also a feature of this invention that sequential circuit operation is achieved by serially connecting a reed switch of one ferreed with a winding on a complementary ferreed to take advantage of the inherent delay between the establishment of remanent magnetic states in the ferrite members of the ferreed and the subsequent operation of the responsive reed switches.

Yet another feature of this invention is a binary cell utilizing the fast storage of a remanently magnetic member and the reliable steering and readout of subsequently responsive reed switches as contacts.

An additional feature of this invention is a binary cell responsive to pulses of either polarity.

A further feature of this invention includes facilities for preventing a binary cell from responding to input signals while the cell is changing its state.

These and other objects and features of this invention will become apparent when taken in conjunction with the specification, the appended claims, and the attached drawing in which:

*Detailed description*

Figure 1:
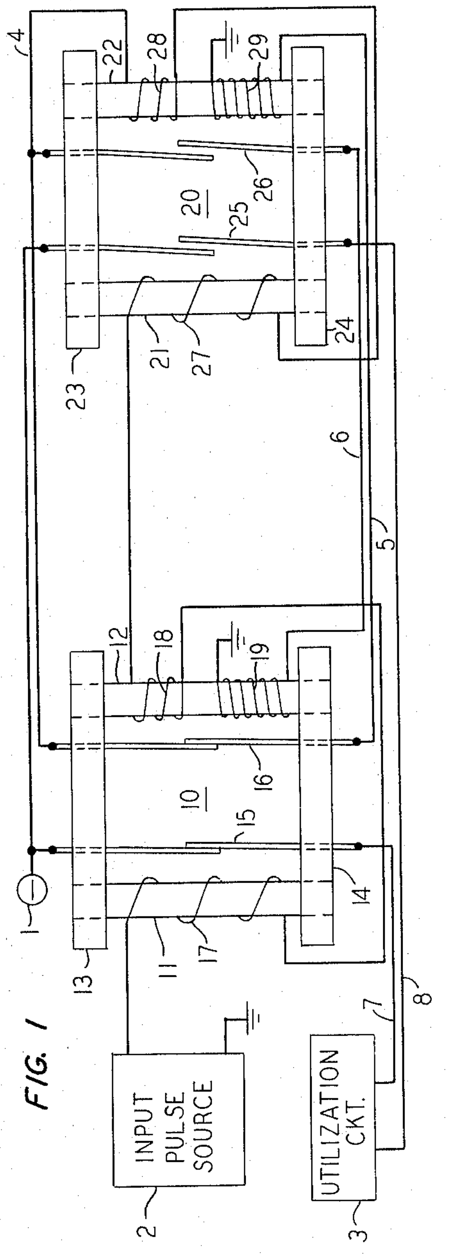
FIG. 1 is a ferreed binary cell employing a gross reset terminal.

Referring first to FIG. 1, the binary cell therein shown comprises two parallel ferreeds basically of the type disclosed in the patent cited supra. Ferreeds 10 and 20 are seen to be identical in structure, and as they make up the binary cell, each ferreed acts as the switching complement of the other; thus, in FIG. 1, ferreed 10 appears in the "set" state with its reed switches 15 and 16 closed, while ferreed 20 appears in its "reset" state with its reed switches 25 and 26 open.

The ferrite members 11 and 12 of ferreed 10 exhibit substantially square hysteresis loop operation, while the elements 13 and 14 are "soft" magnetic pieces with essentially no remanent magnetic qualities. The end pieces 13 and 14 magnetically couple the ferrite members 11 and 12 to the reed switches 15 and 16, the latter also being composed of soft magnetic material.

Winding 17 is associated with ferrite member 11, while windings 18 and 19 are wound on ferrite member 12. For purposes of clarity, the two windings on each of the right-hand ferrite legs of each of the ferreeds (e.g., windings 18 and 19 on ferrite leg 12 of ferreed 10 in FIG. 1) are shown separated; it will be understood that such windings should be uniformly distributed over such legs for proper switching operation. Winding 19 is symbolically shown to have a greater number of turns than does winding 18, the effect of this being that the magnetization resulting from the excitation of winding 19 will control the remanent state of member 12 when windings 18 and 19 are both excited. It is seen that signals from input pulse source 2 always pass through winding 17 in the same direction, and assuming uniform polarity of pulses, the magnetic flux in leg 11 will always be maintained in the same direction (it is to be noted that the binary cell herein described will operate equally well upon the application from source 2 of pulses of either polarity; to facilitate this description, however, positive pulses will be arbitrarily assumed). Ferreed 10, as do all the other ferreeds discussed with relation to the instant invention, operates to close its associated reeds 15 and 16 when "parallel magnetization" is produced in the two ferrite legs 11 and 12; that is, when the directions of the magnetomotive force produced in each of the legs 11 and 12 are opposing (in the upward direction with positive pulses), opposite magnetic poles are produced longitudinally across the reed switches 15 and 16. The reeds thereby close if they have priorly opened, or remain closed if they have been priorly closed. On the other hand, should "series magnetization" be produced in the two ferrite legs of the ferreed, the reed switches 15 and 16 will open; that is, with the direction of magnetomotive force produced in leg 11 upward and that produced in leg 12 downward (or vice versa), no external magnetic poles are produced across the reed switches. Therefore, since the elements 13 and 14 provide a complete flux path around the ferreed, the upward magnetization (according to the right-hand rule) in leg 11 and the downward magnetization in leg 12 are magnetically coupled by the soft magnetic members 13 and 14 to provide a circular flux path resulting in the release of the reed switch from their prior closed condition, as more fully described in the ferreed patent cited supra.

With the binary cell shown in FIG. 1 in the condition whereby the reeds of ferreed 10 are closed and those of ferreed 20 are open, one of the two possible binary conditions is demonstrated. The first pulse from source 2 will pass through the path which includes winding 17 on ferrite leg 11, winding 18 on ferrite leg 12, winding 27 on ferrite leg 21, winding 28 on ferrite leg 22, conductor 4, closed reed switch 16, conductor 5, and finally set winding 29 also on ferrite leg 22 to ground. Since the ferrite members respond to the thusly created excitation states in the order of microseconds, changes in the remanent magnetic states of these legs will occur before any of the corresponding changes in the positions of the associated reed switches, the latter responding to such changes in the remanent magnetic states of the ferrite legs after a relatively longer interval has passed. The input pulse from source 2, having traversed the path delineated supra, magnetizes the respective ferrite legs as follows: Leg 11 is magnetized in the upward direction, leg 12 is magnetized in the downward direction due to the passage of the input signal through its winding 18 in the only permitted direction; leg 21, in a manner substantially identical to that described supra with relation to leg 11, is also magnetized in the upward direction due to the passage of the input pulse through its associated winding 27; leg 22 will be magnetized in the upward direction as a result of the cumulative magnetization effect produced by the passage of the input signal through both of its associated windings 28 and 29. If windings 28 and 29 were equal in the number of turns, the passage of current through both of the windings would produce magnetic effects which would cancel each other; therefore, the method of differential excitation referred to in the general description supra is employed. The excitation of winding 28 has the isolated effect of producing a downward magnetization in leg 22, while the excitation of winding 29 has the isolated effect of producing an upward magnetization in that leg of greater magnitude than that resulting from the excitation of winding 28. Superimposing the two magnetic effects, the magnetization due to winding 29 will be seen to control the remanent magnetic state of leg 22, since winding 29 has a greater number of turns than has winding 28.

Therefore, to summarize the magnetization states that have been produced by the first pulse from source 2: legs 11, 21, and 22 are magnetized in the upward direction, while leg 12 is magnetized in the downward direction. With relation to ferreed 10, the magnetization states of its associated legs 11 and 12 are thus seen to comprise the series magnetization referred to supra, this causing the reed switches 15 and 16 to open after an interval which the Bell System Technical Journal article, cited supra, mentions as approximately 20 microseconds, has elapsed (this interval is illustratively longer than the duration of the input signal from source 2). Similarly, with relation to ferreed 20, its associated legs 21 and 22 are both magnetized in the upward direction, and parallel magnetization is seen to exist, thereby causing reed switches 25 and 26 to close after an interval of the order of a millisecond has passed. In actual practice, the reeds of one ferreed exhibited a final closure time of 450 microseconds with the much shorter release time of 20 microseconds (see Bell System Technical Journal, January 1960, p. 14). Thus, the upper limit placed on the transmission time of an input pulse from source 2 through the cell's circuit so that the breaking of pulse current will be avoided is the 20 microsecond allowance for the reeds to release.

It is to be noted that due to the disparity in reed operate and release times, the cell is isolated from the input after the contacts of the priorly operated ferreed have released, but before the other ferreed's contacts have operated. For example, approximately 20 microseconds after ferreed 10 of FIG. 1 is magnetically reset, its reeds 15 and 16 open; however, reeds 25 and 26 of ferreed 20 will not close until approximately 450 microseconds after ferreed 20 has been magnetically set. This leaves an interval of approximately 430 microseconds during which no reeds are closed, thereby advantageously providing no electrical path to ground for otherwise interferring signals (e.g., spurious or transient signals) during that "immunizing" interval.

Therefore, approximately one half of a millisecond after the first signal from source 2 has been transmitted through the binary cell shown in FIG. 1, the reed switches 15 and 16 have opened, while the reed switches 25 and 26 have closed, this representing the second of the two possible binary conditions of the cell. The next pulse from source 2 has a similar although complementary effect on the cell as did the first signal from said source. The path across which this second signal is transmitted includes winding 17 on leg 11, winding 18 on leg 12, winding 27 on leg 21, winding 28 on leg 22, conductor 4, closed reed switch 26, conductor 6 and controlling set winding 19 on leg 12 to ground. The magnetization states produced in the ferrite legs of ferreeds 10 and 20 of the binary cell when it is in the state which is the complement of that shown in FIG. 1 have the following directions: Legs 11, 12, and 21 are magnetized in the upward direction, while leg 22 is magnetized in the downward direction. In this case, differential excitation of leg 12 allows the magnetic effect attributed to winding 19 to control the magnetization direction of leg 12. This configuration of flux directions results in parallel magnetization for ferreed 10 and series magnetization for ferreed 20. Assuming the operational times mentioned supra, the reed switches 25 and 26 will release approximately 20 microseconds after the above-mentioned remanent magnetic states have been produced in the ferrite legs 21 and 22 of ferreed 20; the reed switches 15 and 16 of ferreed 10 will finally close approximately 450 microseconds after the production of the parallel magnetization states in that ferreed's associated ferrite legs 11 and 12. Therefore, approximately 450 microseconds after the passage of the second pulse from source 2 through the binary cell, both the remanent magnetization states of ferreeds 10 and 20 and the position of the respectively associated reed switches 15 and 16, and 25 and 26, have returned to the initial condition as shown in FIG. 1.

The proper operation of the binary cell is insured by the delay in operation of the reed switches of the two ferreeds. Such delay allows signals to pass from source 2 through the windings and reed contacts of the cell prior to the operation of these same reed contacts in response to the relatively instantaneous magnetization changes produced by the excitation of the windings by the input signal. Since signals from source 2 alternately open the reed switches 15 and 16 of ferreed 10 and also close the reed switches 25 and 26 of ferreed 20, the delay inherent in the operation of the reed switches in response to changes in magnetic state of the remanent ferrite members is a significant factor which allows for a sequential circuit operation in general and for the operation of the instant binary cell in particular.

If source 2 delivered negative pulses at any time to the cell of FIG. 1 (also applicable to FIG. 2, infra), it is apparent that although all magnetization directions mentioned supra would be reversed, the closure and release states of the ferreeds would remain the same. That is, the binary cells of the instant invention are bipolar responsive devices, since both the "parallel" and "series" magnetization states affect the reed switches identically when all ferrite leg magnetization directions reverse.

Throughout the switching operations of the two ferreeds of the binary cell, the utilization circuit 3 is kept informed of the state in which each of the ferreeds 10 and 20 exist at any one time. This is accomplished by providing a potential source, such as 1 in FIG. 1, connected through one of the two reed switches in each of the ferreeds, the closure of any one of the reeds completing a circuit from the potential source to the utilization circuit. For example, when the binary cell is in the state illustrated in FIG. 1 with ferreed 10 set and its reed switches closed, and ferreed 20 reset with its reed switches open, the potential source 1 will furnish an output signal through closed reed switch 15 to the utilization circuit 3 on the conductor 7. Similarly, when the binary cell assumes its other possible binary state wherein ferreed 20 is set with its reed switches closed and ferreed 10 is reset with its reed switches open, the potential source 1 is seen to provide an electrical indication through closed reed switch 25 on conductor 8 to the utilization circuit 3 indicating the binary status of the cell. It is to be noted that this method of providing an external indication of the state in which the binary cell exits at any one time is completely nondestructive of the remanent magnetic states existing in the respective ferrite members and that no output overlap exists due to the substantial disparity between the release and operate times of the reed switches. Numerous similar readout schemes may of course be advantageously employed.

Figure 2:
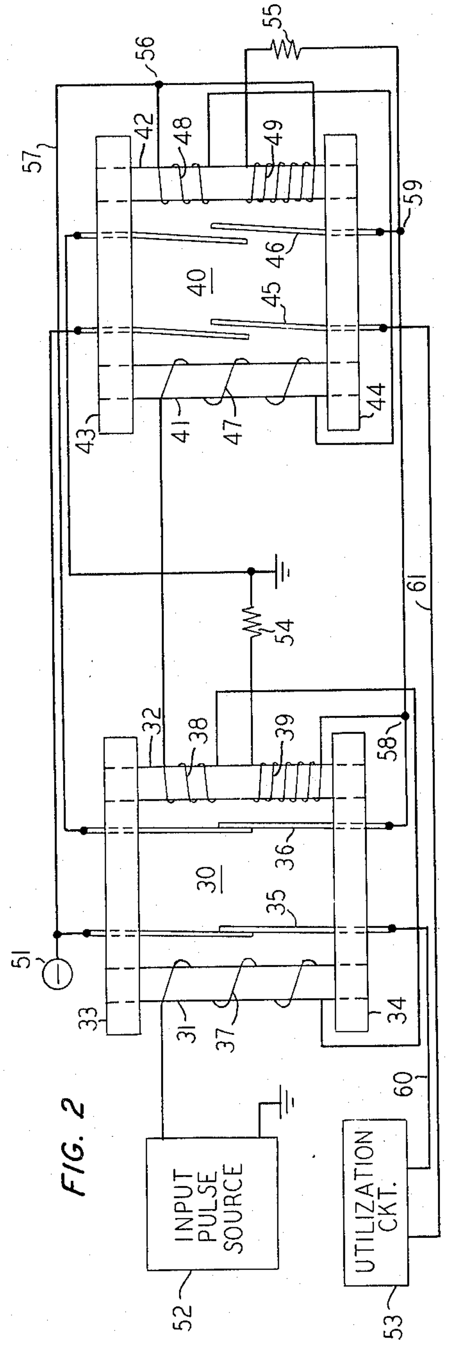
FIG. 2 is an alternate embodiment of such a cell employing a gross set terminal.

The ferreed binary cell shown in FIG. 2 is related to that shown in FIG. 1 but certain differences will become apparent as the discussion proceeds. However, the basic principles of ferreed operation still apply. The input pulse source 52 of FIG. 2 is connected to the winding 37 wound on ferrite leg 31 of ferreed 30; similarly, windings 38 and 39 are associated with ferrite leg 32, winding 47 with ferrite leg 41 of ferreed 40, and windings 48 and 49 with ferrite leg 42 also of ferreed 40. It will be noted when comparing the first ferreed of each of the two cells disclosed in the instant invention, namely ferreed 10 and ferreed 30 (this analysis being equally applicable to ferreeds 20 and 40), that the orientation of the windings on the switching ferrite leg of each of the two ferreeds is oppositely arranged. That is, winding 18 on ferrite leg 12 of ferreed 10 in FIG. 1 is wound oppositely from winding 38 on ferrite leg 32 of ferreed 30 in FIG. 2, the same opposite relationship existing in windings 19 and 39 on the two ferreeds respectively. Such opposite windings merely have the effect, as will be shown infra, of creating differently directed magnetization states in the switching ferrite legs in FIG. 2 than in those of FIG. 1.

The protective resistors 54 and 55 are provided in order to prevent short-circuit damage to the windings 39 and 49 respectively when the reed contacts 46 and 36 respectively are closed. By being serially connected to their respective reset windings 39 and 49, the resistors also serve to insure a proper current distribution substantially bypassing the windings when the respective closed reed contacts shunt the winding-resistor series combination.

With the binary cell of FIG. 2 in the condition therein illustrated with the reed switches 35 and 36 of ferreed 30 closed and with the switches 45 and 46 of ferreed 40 open, the two ferreeds are respectively set and reset, this being one of the two complementary binary states. The next pulse from input pulse source 52 will traverse a transmission path which includes winding 37 on ferrite leg 31, winding 38 on ferrite leg 32, winding 47 on ferrite leg 41, winding 48 on ferrite leg 42, terminal 56, conductor 57, closed reed switch 36, reset winding 39 on ferrite leg 32 and finally through resistor 54 to ground. It will be seen that the current distribution which occurs at terminal 56 is between the paths including conductor 57 and closed reed switch 36 to terminal 58 or through winding 49 and resistor 55 also to terminal 58. The delineation of these two possible paths indicates that the negligible impedance of the path between terminals 56 and 58 including the conductor 57 and the reed switch 36 is the one through which the input signal will actually pass.

The magnetization states thereby created in the various ferrite legs by the excitation produced in the energized windings are as follows: Ferrite legs 31, 41, and 42 are magnetized in the upward direction, while ferrite leg 32 is magnetized in the downward direction due to the cumulative magnetization effect produced by the differential excitation associated with the relatively larger winding 39 and the relatively smaller winding 38 on ferrite leg 32. Such resultant magnetization states are seen to comprise series magnetization in ferreed 30 and parallel magnetization in ferreed 40, thus tending to open the reed switches 35 and 36 of ferreed 30 and to close the reed switches 45 and 46 of ferreed 40.

Referring again to the nominal operational time values cited supra, it is seen that if the duration of the input pulse from source 52 is kept below 20 microseconds, no breaking of pulse current will occur, thus enhancing the life of the reed switches. In practice, such time value is easily controllable, and the relatively larger closure time of approximately 450 microseconds, in this case associated with reed switches 45 and 46 of ferreed 40, poses no such problem. In fact, as mentioned supra with relation to FIG. 1, these delays in the operation of the reed switches of each of the ferreeds in the binary cell expressly allow for the completion of an input pulse's transmission and its corresponding establishment of remanent magnetic states in the appropriate ferrite legs before the responsive reed switches open or close. Thus, the steering reed switch in each of the two ferreeds, namely reed switch 36 in ferreed 30 and reed switch 46 in ferreed 40, is so arranged when closed as to provide logical gating signals to alter the state of both ferreeds of the binary cell.

When the responsive reed switches 45 and 46 of ferreed 40 have closed and those of ferreed 30 have opened, the second complementary binary configuration exists with ferreed 40 set for ferreed 30 reset. The next pulse from input pulse source 52 will traverse a path including winding 37 on ferrite leg 31, winding 38 on ferrite leg 32, winding 47 on ferrite leg 41, winding 48 on ferrite leg 42, winding 49 also on ferrite leg 32, resistor 55, and closed reed switch 46 to ground. The possible signal distribution under these circumstances occurs at terminal 59, but it is obvious that the path therefrom to ground which includes only closed reed switch 46 precludes the passage of an electrical signal from terminal 59 to terminal 58 and through winding 39 and resistor 54 to ground.

As with the other magnetization states established as described supra, the states herein established as as follows: Ferrite legs 31, 32, and 41 are magnetized in the upward direction, while ferrite leg 42 is magnetized in the downward direction due to the differential excitation of ferrite leg 42 based on winding 49 having a greater number of turns than winding 48. Therefore, with parallel magnetization existing in ferreed 30 and series magnetization in ferreed 40, the reed switches 35 and 36 of ferreed 30 will now close, while switches 45 and 46 of ferreed 30 will open. Such operation will be completed approximately 450 microseconds after the establishment of the remanent magnetic states in the ferreed whose reed switches are closed, namely ferreed 40, and the binary cell thereby returns to its original configuration as illustrated precisely in FIG. 2.

In a manner substantially identical with that described in relation to FIG. 1, the readout circuitry provides a continuous external indication of the binary state of each of the cell's ferreeds and thus of the state of the binary cell as a whole. More specifically, potential source 51 in FIG. 2 is connected to the readout switch 35 of ferreed 30 and when such switch closes or remains closed, an appropriate electronic indication will thereby be delivered to the utilization circuit 53 on conductor 60. Similarly, when the binary cell which includes the ferreeds 30 and 40 is in the state which is the complement of that shown in FIG. 2, an indication of that condition will be delivered to the utilization circuit 53 from the potential source 51 through closed reed switch 45 of ferreed 40 and conductor 61.

It is understood that the above-described arrangements are merely illustrative of the principles of the invention. Numerous and varied other arrangements can readily be devised in accordance with these principles by those skilled in the art without departing from the spirit and scope of the invention.

What is claimed is:

1. A binary cell comprising two elements, a plurality of remanent magnetic means included in each of said elements, a plurality of windings wound on said magnetic means, input means operative to excite selected ones of said windings to establish in said remanent magnetic means a first condition, a plurality of contact means in each of said elements operative in response to changes in said remanent magnetic means between said first condition and a second condition, said plurality of contact means including first contact means operative to steer signals from said input means to selected ones of said windings in the other of said elements, a utilization circuit, and output means including second of said contact means in each of said elements for furnishing said utilization circuit with an isolated indication of the condition of said remanent magnetic means.

2. A binary cell in accordance with claim 1 wherein said output means includes a common source of potential coupled to said second contact means.

3. A binary cell in accordance with claim 1 wherein each of said elements includes a first of said windings to maintain a first of said remanent magnetic means permanently in said first condition and a second and a third of said windings of unequal turns operative to switch a second of said remanent magnetic means between said first and said second conditions.

4. A binary cell comprising two elements, a plurality of remanent magnetic means included in each of said elements, a plurality of windings wound on said magnetic means, input means operative to excite selected ones of said windings to establish in said remanent magnetic means a first condition, a plurality of contact means in each of said elements operative in response to changes in said remanent magnetic means between said first condition and a second condition to steer signals from said input means to selected ones of said windings in the other of said elements, a utilization circuit, and output means including one of said contact means in each of said elements for furnishing said utilization circuit with an isolated indication of the condition of said remanent magnetic means, each of said elements including a first of said windings to maintain a first of said remanent magnetic means permanently in said first condition and a second and a third of said windings of unequal turns operative to switch a second of said remanent magnetic means between said first and said second conditions, each of said elements including one of said contact means for steering signals from said input means to said third winding of the other of said elements.

5. A binary cell responsive to input signals from an input pulse source, said cell comprising two elements, each of said elements including remanent magnetic means, a plurality of windings wound on said remanent magnetic means and responsive to selected ones of said signals for selectively establishing said remanent magnetic means in one of a first and second conditions in a first relatively short time interval, switching means operative in a second relatively longer time interval in response to the establishment of said first and said second condition in said remanent magnetic means, steering means including one of said switching means in a first of said elements for steering said signals to selected ones of said windings of the other of said elements prior to the termination of said second time interval, and output means for indicating the remanent magnetic condition of each of said elements.

6. A binary cell in accordance with claim 5 including in addition utilization circuit means and a source of potential common to each of said elements, wherein said output means includes one of said switching means for delivering signals from said common potential source to said utilization circuit means.

7. A binary cell in accordance with claim 5, wherein said remanent magnetic means in each of said elements includes a first member responsive to said signals from said input pulse source through a first of said windings to permanently maintain said first member in said first condition, and a second member responsive to signals from said input pulse source through a second and a third of said windings to alternately maintain said second member in said first and said second conditions.

8. A binary cell in accordance with claim 7 wherein said third winding has a greater number of turns than said second winding.

9. A binary cell in accordance with claim 7 including in addition common reference potential means, and shunting means including said steering means in each of said elements for providing a low impedance path to said common means across said third winding of the other of said elements.

10. A binary cell responsive to a source of input pulses comprising two elements, each of said elements including first and second remanent magnetic members, a plurality of winding means, a first of said winding means being coupled to said first member for maintaining said first member permanently in a first state, additional ones of said winding means being coupled to said second member for delivering said input pulses from said source to change the state of said second member, contact means operative in response to changes in state of said second member, and steering means including certain of said contact means for transmitting said pulses to selected ones of said winding means of the other of said elements.

11. A binary cell in accordance with claim 10 including in addition output means for indicating the state of said second member comprising utilization circuit means, common potential means, and means including one of said contact means coupling said common potential means to said utilization circuit means.

12. A binary cell uniformly responsive to positive and negative input pulses from a source of positive and negative input pulses, said cell comprising two ferreeds, each of said ferreeds including a first and a second remanent magnetic member each capable of selectively assuming a first and a second state, a plurality of exciting windings wound on said second member and responsive to selected ones of said pulses for changing the state of said second member between said first and said second state, and reed contact means responsive to said changes in state for steering selected ones of said pulses to said windings of the other of said ferreeds.

13. A binary cell in accordance with claim 12, including in addition output means responsive to said changes of state of said second member for indicating the state of said second member of each of said ferreeds.

14. A binary cell in accordance with claim 13, including additional winding means responsive to said positive and negative input pulses for maintaining said first member in said first state and said second state respectively.

15. A binary cell responsive to input pulses comprising two elements, each of said elements including remanent magnetic means, a plurality of winding means for changing the state of said remanent magnetic means in response to selected ones of said pulses, and means for electrically isolating said windings to prevent the passage of spurious signals to said windings during intervals between successive ones of said pulses, said isolating means including contact means connected to said winding means and operative in response to said changes in state of said remanent magnetic means.

16. A binary cell responsive to a source of input pulses comprising two elements, each of said elements including remanent magnetic means for assuming a particular binary state in response to selected ones of said pulses, a plurality of exciting windings coupled to said remanent magnetic means for selectively establishing said remanent magnetic means in said state, and immunizing means connected to said windings and responsive to the assumption of said binary states by said remanent magnetic means for preventing said windings from being energized by spurious signals intermediate said pulses.

17. A binary cell responsive to a source of input pulses comprising two elements, each of said elements including remanent magnetic means for assuming a particular binary state in response to selected ones of said pulses, a plurality of exciting windings coupled to said remanent magnetic means for selectively establishing said remanent magnetic means in said state, and immunizing means for preventing said windings from being energized by spurious signals intermediate said pulses, said immunizing means including first switching means operative in a first time interval in response to said changes in state of said remanent magnetic means in a first of said elements for disconnecting said source from selected ones of said windings and second switching means operative in a second relatively longer time interval in response to said changes in state of said remanent magnetic means in a second of said elements for connecting said source to others of said windings.

References Cited by the Examiner

UNITED STATES PATENTS 3,118,090 1/1964 Keller ------------- 317—137

NEIL C. READ, *Primary Examiner.*

P. XIARHOS, *Assistant Examiner.*